United States Patent [19]

Payne

[11] 4,110,679
[45] Aug. 29, 1978

[54] FERROUS/NON-FERROUS METAL DETECTOR USING SAMPLING

[75] Inventor: George C. Payne, Tempe, Ariz.

[73] Assignee: White's Electronics, Inc., Sweet Home, Oreg.

[21] Appl. No.: 805,025

[22] Filed: Jun. 9, 1977

Related U.S. Application Data

[63] Continuation-in-part of Ser. No. 526,678, Nov. 25, 1974, Pat. No. 4,030,026.

[51] Int. Cl.² .............................................. G01V 3/10
[52] U.S. Cl. ...................................................... 324/3
[58] Field of Search ....................... 324/3, 6, 233, 239; 340/258 C

[56] References Cited

U.S. PATENT DOCUMENTS

| | | | |
|---|---|---|---|
| 3,337,796 | 8/1967 | Hentschel et al. | 324/233 |
| 3,391,336 | 7/1968 | Hentschel | 324/233 |
| 3,434,048 | 3/1969 | Law et al. | 324/239 |
| 3,471,772 | 10/1969 | Smith | 324/3 |
| 3,676,772 | 7/1972 | Lee | 324/233 |
| 3,707,672 | 12/1972 | Miller et al. | 324/239 |
| 3,798,538 | 3/1974 | Mansson | 324/233 |
| 3,848,182 | 11/1974 | Gerner et al. | 324/233 |
| 3,852,663 | 12/1974 | Brooks et al. | 324/233 |
| 3,980,947 | 9/1976 | Bielsten et al. | 324/233 X |
| 4,044,302 | 8/1977 | Mayberry | 324/239 |

FOREIGN PATENT DOCUMENTS 1,315,684  5/1973  United Kingdom ....................... 324/3

Primary Examiner—Gerald R. Strecker

Attorney, Agent, or Firm—Klarquist, Sparkman, Campbell, Leigh, Hall & Whinston

[57] ABSTRACT

A metal detector for detecting and distinguishing between ferrous and non-ferrous objects in an area which may contain a ferrous, mineralized soil background is disclosed. The hysteresis effect is used to distinguish between ferrous and non-ferrous objects by generating groups of transmit current pulses, each group including a polarizing pulse of one polarity followed by a pair of read pulses of the opposite polarity and less magnitude. The transmit pulses are applied to a transmit coil to induce corresponding receive voltage pulses in a receive coil. A pair of receive pulses corresponding to the read transmit pulses are fed through a low pass filter and thereafter sampled to produce a sample output signal corresponding to the difference between the sampled voltage levels of the pair of receive pulses. Control means are provided to adjust the sampling times such that when the metal detector is placed over an area containing a ferrous, mineralized soil background and no metallic objects, the sample output signal will be a constant D.C. voltage. This eliminates the effect of mineralized soil, which otherwise tends to prevent the detection of metallic objects. Thereafter, as the metal detector is moved around and used to search for metallic objects, it will indicate the presence of a ferrous object by a first polarity sample output signal and will indicate the presence of a non-ferrous object by an opposite polarity sample output signal. Demodulator means, such as a balanced synchronous demodulator, is provided to generate detector outputs corresponding to the ferrous or non-ferrous sample output signals and to nullify the effect of relative motion between the metal detector and the objects being detected.

15 Claims, 5 Drawing Figures

FERROUS/NON-FERROUS METAL DETECTOR USING SAMPLING

RELATED APPLICATION

The present application is a continuation-in-part of my United States patent application Ser. No. 526,678, filed Nov. 25, 1974 and issued on June 14, 1977 as U.S. Pat. No. 4,030,026.

BACKGROUND OF INVENTION

In the past, metal detectors have suffered from the inability to distinguish between ferrous and non-ferrous objects in the ground, especially when the ground contains a ferrous, mineralized soil background such as black sand or a ferric oxide bearing soil. This mineralized soil background electromagnetically resembles a ferrous object, tends to mask ferrous objects from detection and "confuses" the metal detector, resulting in false outputs. Metal detectors in the past have generated an output when no objects were present because of the presence of a ferrous, mineralized soil background. This is very undesirable since the paramount goal for the use of the metal detector is to locate metallic objects in the ground, and there are many areas where ferrous, mineralized soil is present which frustrates the use of known metal detectors.

In addition, sampling metal detectors which employ low sampling rate suffer from the inability to nullify the effect of relative motion between the metal detector and the ground containing the objects to be detected. This effect causes a stronger signal to be generated by the metal detector as it is moved closer to the ground and a weaker signal to be generated as the detector is moved further away from the ground. This results in confusion and frustrates the operation of the detector because stronger or weaker signals also may indicate the size, mass or depth of an object when there is no relative motion between the detector and the ground.

It is therefore the primary object of the present invention to provide an improved metal detector capable of detecting and distinguishing between ferrous and non-ferrous objects in an area which may contain a ferrous mineralized soil background.

Another object of the invention is to provide such a metal detector which employs the hysteresis effect and sampling to distinguish between ferrous and non-ferrous objects and to eliminate the effect of mineralized soil.

It is still another object of the present invention to provide an improved metal detector which nullifies the effect of relative motion between the metal detector and the ground.

It is a further object of the present invention to provide a metal detector with an adjustable electronic sampling circuit to eliminate the effects of a ferrous mineralized soil background on the metal detector.

It is a still further object of the present invention to provide an improved metal detector including a balanced synchronous demodulator circuit for nullifying the effect of relative motion between the metal detector and the ground.

SUMMARY OF INVENTION

The metal detector in the preferred embodiment of the present invention includes a transmit pulse generator which applies groups of transmit current pulses to a transmit coil, each group including a polarizing pulse of one polarity followed by a pair of read pulses of the opposite polarity and of lesser magnitude. A sample and hold circuit, connected to the receive coil by a low pass filter, samples the pair of receive voltage pulses induced in a receive coil by the application of the pair of read pulses to the transmit coil, and generates a sample output signal corresponding to the difference between the two sampled voltage levels of the two receive pulses. The time of sampling is adjustable by a control means to eliminate the effect of mineralized soil. The control means consists of a ramp generator whose ramp voltage output is synchronized with the transmit pulses and is connected to one of the inputs of a voltage comparator. An adjustable A.C. reference voltage is connected to the second input of the comparator to control the switching level of such comparator. The comparator output produces a sample pulse which switches the sample and hold circuit. By adjusting the reference voltage, the comparator is controlled to switch at different levels on the ramp voltage, thereby causing the sample and hold circuit to sample the two receive voltage pulses at different adjustable points in time. This operation may be carried out when the metal detector is over an area containing a ferrous mineralized soil background with no ferrous or non-ferrous objects present. The sampling times are then adjusted so that samples are taken at the same voltage level on both of the pair of receive signals which means that the sample output signal is a constant D.C. voltage.

A balanced, synchronous demodulator is connected to the output of the sample and hold circuit to eliminate the effect of detector coil motion. The demodulator generates a first demodulator output voltage containing an average D.C. component of a first polarity if the sample output signal is a first polarity voltage square wave due to the presence of a ferrous object in the area. The demodulator generates a second and different demodulator output voltage containing an average D.C. component of the opposite polarity to the first output, if the sample output signal is a voltage square wave signal opposite in polarity to the first polarity voltage square wave due to the presence of a non-ferrous object in the area. The demodulator generates a third demodulator output voltage containing a zero average D.C. component if the sample output signal is a constant D.C. voltage. If the sample output voltage changes in magnitude due only to relative motion between the metal detector and the ground, the aforesaid demodulator outputs are unaffected. This results in the detection of ferrous or non-ferrous objects in the area regardless of whether the area contains a mineralized soil background or not, and regardless of whether or not there is relative motion between the metal detector and the ground.

DRAWINGS

Further objects, features and advantages of my invention will become apparent from a consideration of the following description of a preferred embodiment thereof, the appended claims and the accompanying drawings of which:

DESCRIPTION OF PREFERRED EMBODIMENT

Figure 1:
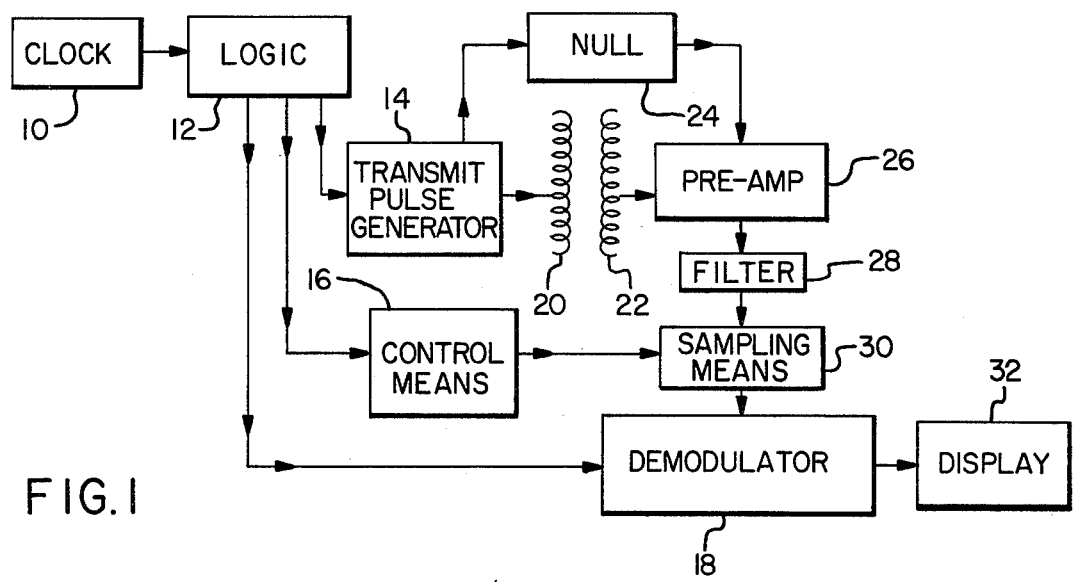
FIG. 1 is a schematic, general block diagram of the present invention.

Referring to FIG. 1 the general system of the metal detector of the present invention comprises an audio frequency master clock oscillator 10 connected to a logic synchronizer 12. The combination of the master clock and the logic synchronizer provide the necessary timing synchronization between the various circuit components utilized in the present invention and operate as to be hereinafter described. Logic synchronizer 12 has different outputs connected to a transmit pulse generator 14, a control means 16, and a demodulator 18 synchronizing their operation. The transmit pulse generator 14 is connected to transmit coil means 20 supplying the necessary transmit current pulses to the coil as hereinafter described. A receive coil means 22 is provided and located such that it is electromagnetically coupled with the transmit coil means 20 by an area which is to be investigated for the presence of ferrous or non-ferrous objects and which may contain a mineralized soil background. Therefore, a transmit current flowing in the transmit coil will cause a receive voltage to be induced in the receive coil.

A nulling means 24 is connected from the transmit pulse generator 14 to a receive coil signal preamplifier 26, and is adjustable so as to cancel any residual voltage induced in the receive coil 22 by current flowing in the transmit coil 20 when only air electromagnetically couples the coils. Thereafter, the magnitude and polarity of the voltage induced in the receive coil will be dependent upon the ferrous or non-ferrous character of the material present in the area electromagnetically coupling the two coils. A low pass filter 28 is provided to filter the receive voltage pulses at the output of the preamplifier 26 before such receive pulses are sampled by sampling means 30. The sampling means 30 includes a sample and hold circuit which stores the sample output voltage between samples. Control means 16 is connected to sampling means 30 whereby the sampling time is adjustable by the adjustment of the control means. As a result of such adjustment the sampling means is caused to sample a pair of receive voltage signals where the sampled voltage levels are equal when only a ferrous, mineralized soil background is present, to eliminate the effect of such mineralized soil, as hereinafter described. The demodulator 18 receives the sample output signal from the sampling means and demodulates such sample output in a synchronous manner as determined by logic synchronizer 12. The demodulator generates a detector output voltage having a positive average D.C. component if a ferrous object is detected so that the sample output signal is a positive voltage square wave. Conversely, such demodulator generates a detector output voltage containing a negative average D.C. component if a non-ferrous object is detected so that the sample output signal is a negative voltage square wave signal of opposite polarity to the positive square wave. The demodulator generates an output voltage containing a zero average D.C. component if the sample output signal is a constant D.C. voltage. Additionally, the demodulator may be balanced, in a manner to be described later with reference to FIG. 3, such that changes in the magnitude of the sample output signal due only to relative motion between the detector and ground are compensated. The output signal of the demodulator is then connected to a suitable display means 32, such as a meter, to indicate the different possible outputs of the demodulator.

Figure 2:
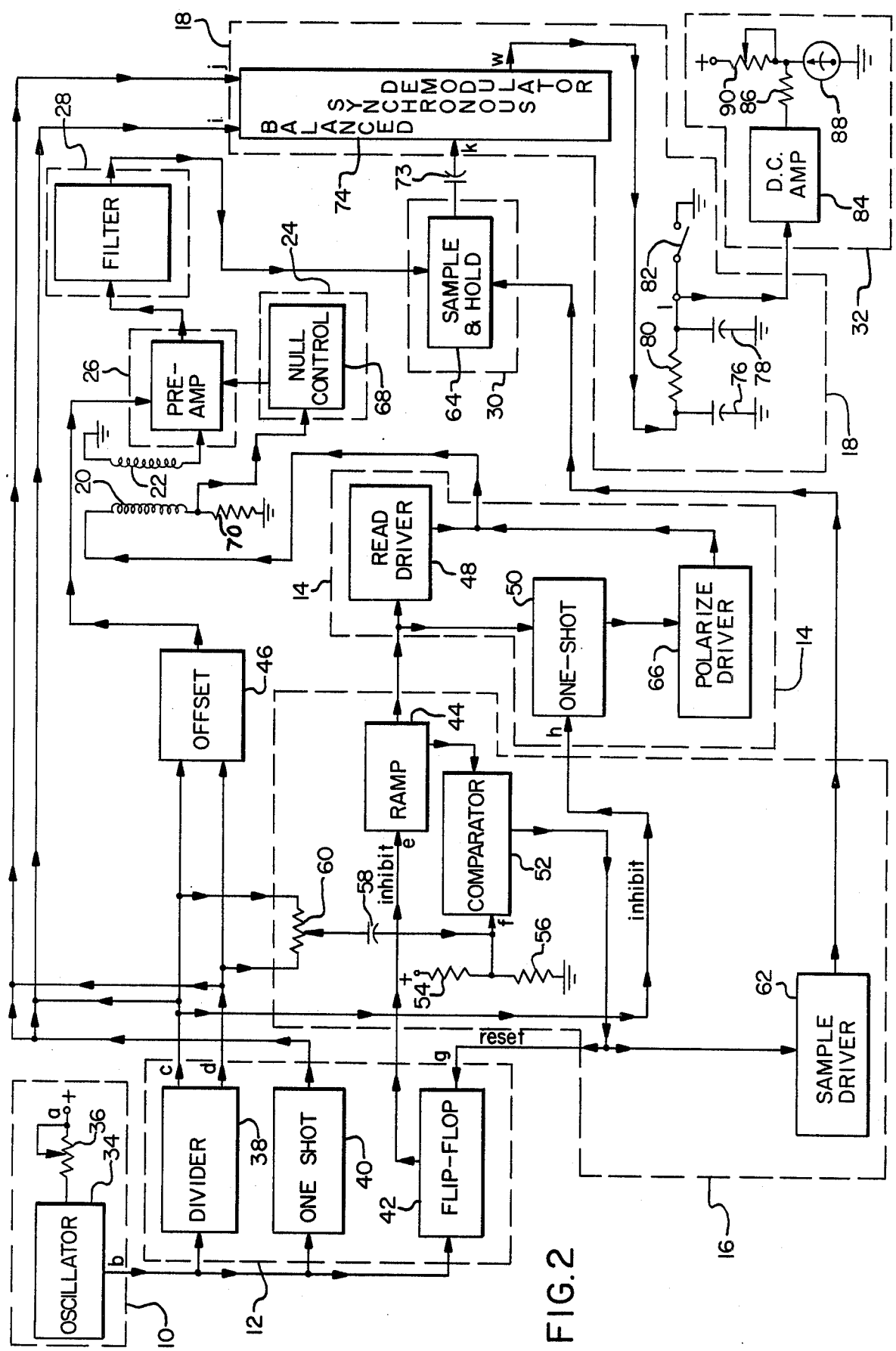
FIG. 2 is a schematic, detailed block diagram of one embodiment of the metal detector circuit of the present invention.
Figure 4:
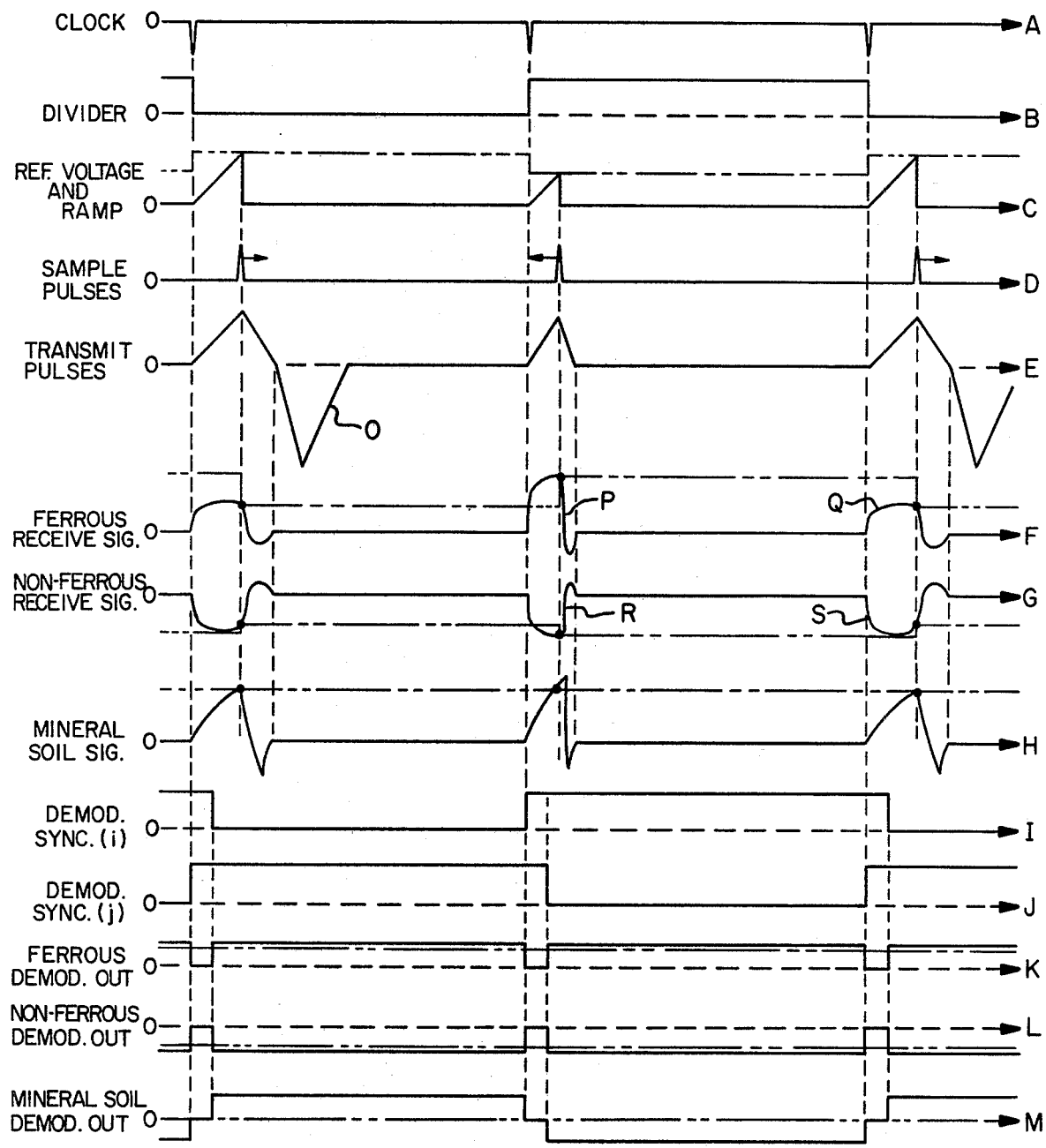
FIGS. 4A to 4M show electrical signal waveforms occurring in the circuit of FIG. 2.

FIG. 2 is a detailed block diagram of a preferred embodiment of the present invention in which the system blocks of FIG. 1 are shown as dashed boxes in FIG. 2 containing smaller blocks. These smaller blocks indicate the circuit components utilized in the present invention. FIG. 4 is a timing diagram of the signal waveforms occurring in the system of FIG. 2.

Referring now to FIG. 2, the master clock 10 consists of an audio frequency oscillator 34 whose pulse repetition frequency is controlled by variable resistors 36 connected to a positive voltage source at terminal a. The clock pulse output of oscillator 34 at terminal b consists of periodic, negative-going voltage spikes shown in FIG. 4A. The clock pulses are separated by any convenient length of time sufficient to enable eddy currents induced in non-ferrous objects to cease, such delay time being about 3.7 milliseconds for a clock frequency of 270 Hz. The output of the oscillator 34 is connected to a "divide by two" frequency divider 38, a one shot or monostable multivibrator 40 and a flip-flop or bistable multivibrator 42 comprising the logic synchronizer 12. The frequency divider has two complementary outputs of opposite phase including a first output waveform at terminal c as shown in FIG. 4B and a second inverted output waveform at terminal d. The one shot 40 provides a positive-going pulse at every clock spike received from oscillator 34, the waveform of which is not shown. The flip-flop 42 has its output connected to a ramp generator 44 and controls such ramp generator such that the absence of an output from the flip-flop inhibits the operation of the ramp generator and prevents it from producing a ramp voltage. Terminals c and d of divider 38 are connected to the two inputs of an offset circuit 46 whose output is connected to preamplifier 26 and is adjustable to offset any change in internal D.C. voltage biases within the preamplifier.

Ramp generator 44 produces a positive voltage ramp beginning at every clock pulse when the inhibit signal is removed at its input terminal e by triggering flip-flop 42 with such clock pulse. This voltage ramp is shown in FIG. 4C and is applied to the inputs of a read driver amplifier 48, one shot multivibrator 50 and voltage comparator 52. It will be seen that the read driver 48 and one shot multivibrator 50 are included in the transmit pulse generator 14, whereas ramp generator 44 and the comparator 52 are included in the control means 16 of FIG. 1. A fixed D.C. reference voltage is provided at input terminal f of comparator 52 by the voltage divider consisting of resistors 54 and 56 connected in series between a positive D.C. voltage source and ground. Also connected to terminal f through an A.C. coupling capacitor 58 is an adjustable amplitude square wave reference voltage provided by potentiometer 60 connected across output terminals c and d of divider 38. The total reference voltage at input f is the D.C. offset square wave shown in phantom in FIG. 4C. It is to be understood that the voltage waveform appearing at terminal f is a D.C. offset square wave whose amplitude is adjustable by potentiometer 60 within the limits set by the voltages on terminals c and d of divider 38.

The output of comparator 52 is connected to the reset terminal g of flip-flop 42 and to the input of a sample driver 62. Comparator 52 switches to produce an output voltage whenever the ramp voltage exceeds the reference voltage at terminal f. The comparator output voltage resets flip-flop 42 thereby turning off and inhibiting the ramp generator, resulting in the series of ramp voltages of different amplitude shown in FIG. 4C.

The sample driver 62 may be a triggered pulse generator whereby a narrow, fast rise time sampling pulse is generated by triggering it with the leading edge of the comparator output. However, such sample driver can also produce the sampling pulse of FIG. 4D merely be differentiating the leading edge of the comparator output voltage. The sample driver output is connected to a sample and hold circuit 64 to switch such sample and hold circuit "on" and take a sample for a time duration equal to the width of the sampling pulse.

One shot multivibrator 50 has its inhibit terminal h connected to terminal c of frequency divider 38 and its trigger input terminal connected to the output of ramp generator 44, so that a trailing edge of the ramp voltage occurring at its trigger input terminal will trigger such one shot and cause it to produce an output pulse whenever the inhibit signal is absent at terminal h. The output of one shot 50 is connected to polarize driver 66. Read driver 48 and polarize driver 66 are current pulse generator amplifiers which are both connected to the transmit coil 20 to apply the groups of transmit current pulses shown in FIG. 4E. Each group of transmit pulses includes a large negative polarizing pulse, o, followed by a pair of positive read pulses of opposite polarity and lower amplitude than the polarizing pulse. However, polarizing pulse o could be positive and the read pulses negative, and more than two read pulses could be used in each group. Only one polarizing pulse is produced for every two ramp voltages because the one shot 50 is inhibited during the second ramp by the divider signal of FIG. 4B.

The output pulses of read driver 48 and polarize driver 66 are applied to transmit coil 20, which is electromagnetically coupled to receive coil 22 by the area to be investigated. The positive "read" pulses cause receive voltage pulses shown in FIGS. 4F, 4G and 4H to be induced in the receive coil 22 due to the presence in such area of ferrous objects, non-ferrous objects, or a ferrous mineralized soil, respectively. The negative "polarize" current pulse also induces a voltage pulse in the receive coil but this is not shown in FIG. 4 since it is not utilized in the present invention.

A null control circuit 68 connects one side of transmit coil 20 to the receive signal. The current flowing in the transmit coil produces a null control voltage across a resistor 70 connected to ground. The null control voltage is applied to the null control circuit 68 to produce a negative feedback signal that cancels the residual receive voltage produced by the receive coil in air. Null control circuit 68 may be of any convenient type such as that shown in my co-pending application Ser. No. 526,678, filed Nov. 25, 1974, issued on June 14, 1977 as U.S. Pat. No. 4,030,026.

The A.C. receive voltage induced in receive coil 22, by the read pulses in the transmit coil 20 is applied to the input of preamp 26 where it is amplified by such preamp. The receive signal output of preamp 26 is transmitted through a low pass filter 28. The filtered receive signals at the output of low pass filter 28 are applied to the sample and hold circuit 64 which is caused to sample the filtered receive signals by the sampling pulses of FIG. 4D from sample driver 62. The sample voltage is stored in the sample and hold circuit 64 and transmitted from its output as the output sample voltage signal shown in phantom in FIGS. 4F, 4G and 4H. The output sample voltages in FIGS. 4F and 4G correspond, respectively, to the presence of a ferrous object and a nonferrous object in the area, while the sample output signal in FIG. 4H corresponds to the presence of ferrous mineralized soil in the area but with no metallic objects present.

The A.C. sample output signal of the sample and hold circuit is A.C. coupled by coupling capacitor 73 to a balanced synchronous demodulator 74 at input terminal k. The demodulator demodulates the A.C. sample voltage into a D.C. voltage detector output signal which is applied to the display means 32. The balanced synchronous demodulator 74 is shown in detail in FIG. 3 and generates internal voltage waveforms at terminal w shown in FIGS. 4K, 4L and 4M for a ferrous object, a non-ferrous object and mineral soil, respectively, as hereinafter described in referring to FIG. 3. These waveforms are applied to the load impedance of the demodulator including two filter capacitors 76 and 78 and filter resistor 80 which form a low pass filter allowing only the average D.C. component of each of such waveforms therethrough as the D.C. output signal of the demodulator at terminal l, shown in phantom in FIGS. 4K, 4L and 4M. A grounding switch 82 is provided for manually grounding terminal l.

The output of the balanced synchronous demodulator 74 is transmitted through D.C. amplifier 84 in the display means 32. A load resistor 86 connected to the output of D.C. amplifier 84 converts the D.C. output voltage to a current which is used to drive the output display meter 88. The meter may be set at any quiescent position when no output current is present by closing switch 82 and adjusting a variable load resistor 90 in series with meter 88, but is preferably set at mid-scale. Switch 82 may also be utilized to reset the meter to its quiescent position during use of the metal detector.

The timing for the operation of the balanced synchronous demodulator 74, as to be hereinafter described in detail, is provided at its timing input terminals i and j. The switching voltage appearing at terminal i and shown in FIG. 4I, is the result of the addition of the divider output voltage of FIG. 4B at terminal c of divider 38 with the positive output pulse of the one shot multivibrator 40 which is produced at each clock pulse. The switching voltage appearing at input j to the synchronous demodulator and shown in FIG. 4J, is the result of the addition of the output of one shot 40 to the complementary output of divider 38 appearing at terminal d.

Figure 3:
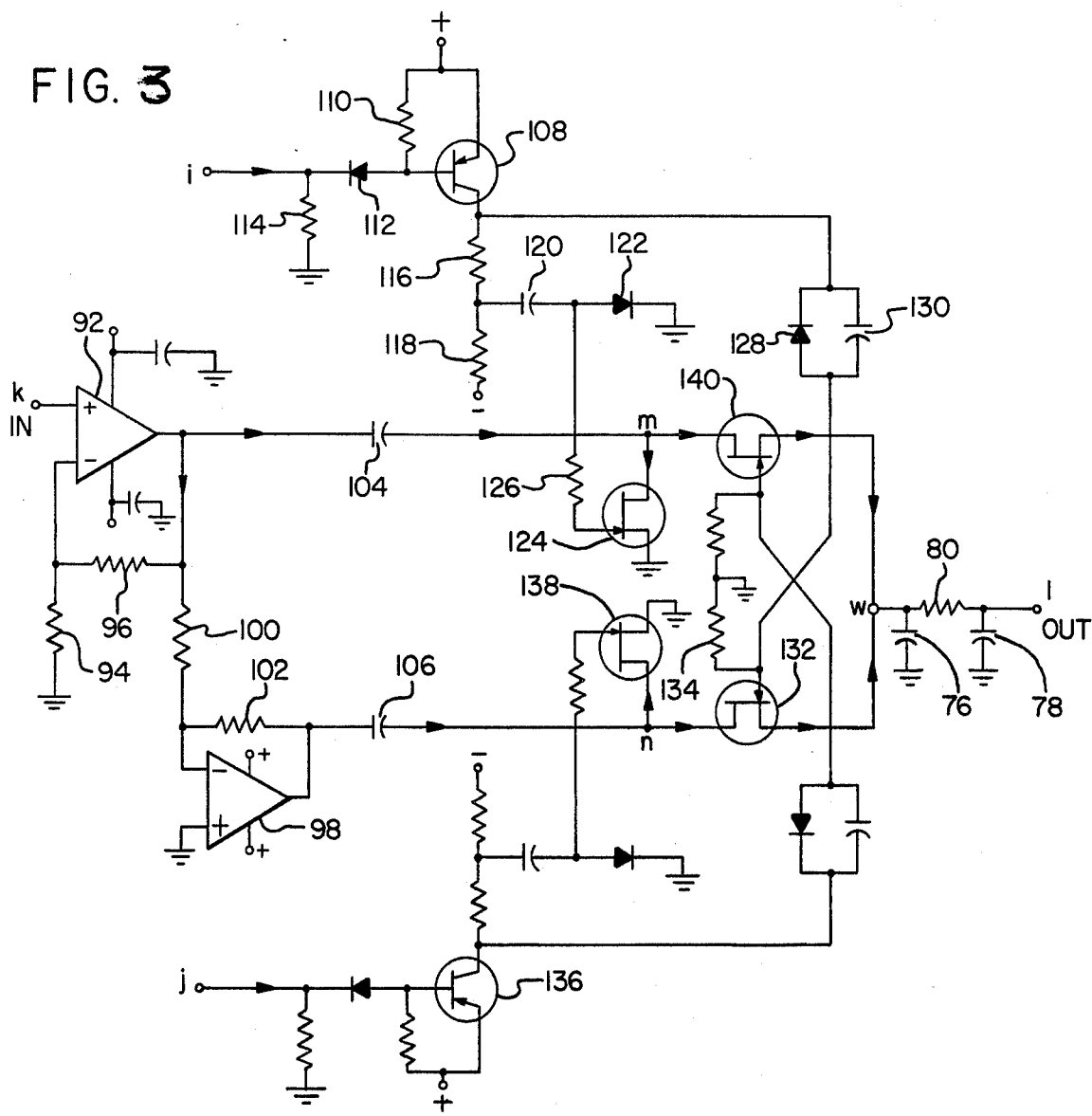
FIG. 3 is a circuit diagram of the balanced, synchronous demodulator shown in block form in FIG. 2.

FIG. 3 shows the circuit of the balanced synchronous demodulator 74 of FIG. 2. It is to be understood that terminals i, j, k, l and w of FIG. 3 correspond to the identical terminals in FIG. 2 of the balanced synchronous demodulator 74. Input k is connected to an A.C. amplifier 92 which may be an operational amplifier whose gain is determined by the ratio of resistors 94 and 96 and may be conveniently set at 100. The output of A.C. amplifier 92 is connected to the negative input of an inverting operational amplifier 98 through input coupling resistor 100. Resistor 100 and feedback resistor 102 determine the gain of inverting amplifier 98 and are equal in value, thereby making the gain of such amplifier unity.

The output of A.C. amplifier 92 is A.C. coupled through capacitor 104 to circuit point m at the common drain electrodes of a pair of PN junction field effect transistors 124 and 140 of N-channel type. The output of inverting amplifier 98 is A.C. coupled through capacitor 106 to circuit point *n* at the common drain electrodes of another pair of similar field effect transistors 138 and 132. It is to be understood that the voltages appearing at circuit points *m* and *n* are inverted with respect to each other. A PNP switching transistor 108 is provided with its emitter connected to a positive D.C. source and its base biased at a convenient operating level by resistor 110. The base of transistor 108 is connected through diode 112 to timing input terminal *i.* An input resistor 114 is connected from terminal *i* to ground. When the voltage of FIG. 4I appearing at terminal *i* is in its zero state, diode 112 will conduct current through resistor 110, thereby turning transistor 108 on. When the voltage at terminal *i* is in its positive state, diode 112 will be no longer conducting, thereby turning transistor 108 off. The collector of transistor 108 is connected through resistors 116 and 118 to a negative D.C. voltage source which may be of equal magnitude to the positive voltage source connected to the emitter of such transistor. It will be seen that the collector will be at approximately the same voltage as the positive voltage source or the negative voltage source depending upon whether transistor 108 is on or off, respectively.

The common point between resistors 116 and 118 is connected to ground through capacitor 120 and diode 122 forming a voltage clamp circuit clamping the positive A.C. voltage swing between resistors 116 and 118 to near zero volts. The common point between capacitor 120 and diode 122 is connected to the gate of field effect transistor (FET) 124 through current limiting resistor 126. It will be seen that when transistor 108 is off, transistor 124 will also be turned off, since its gate voltage will be at the negative voltage source potential. FET 124 is a switch between circuit point *m* and ground at the source of such transistor, thereby grounding circuit point *m* whenever such transistor is on.

The collector of transistor 108 is also connected through the parallel combination of diode 128 and capacitor 130 to the gate of another field effect transistor 132. It will be seen that when transistor 108 is on its collector is positive so that diode 128 will be reversed biased and the FET 132 will be on. Capacitor 130 couples the fast voltage changes from the collector of transistor 108 to the gate of the FET ensuring rapid switching. FET 132 is connected as an electronic switch between circuit point *n* and the output load impedance 76, 78 and 80 of the balanced synchronous demodulator at terminal *w*. Transistor 132 is biased quiescently on by resistor 134 connected between its gate and ground. Similarly another field effect transistor 138 is connected as an electronic switch between point *n* and ground.

From the foregoing description it is to be understood that a positive voltage at input terminal *i* will result in transistor 108 being switched off thereby turning FETs 124 and 132 off. However, when zero voltage is applied to such input terminal, transistor 108 is on and FETs 124 and 132 are on. Thus the waveform of FIG. 4I causes circuit terminal *m* to be alternatively grounded and not grounded, while circuit terminal *n* is, correspondingly, alternately connected and not connected to terminal *w* and the load impedance.

It will be seen that the synchronous demodulator is electrically symmetrical or balanced regarding the operations performed by it on the signals appearing at circuit terminals *m* and *n*. A positive voltage on terminal *j* will switch transistor 136 off and FETs 138 and 140 off. A zero voltage appearing at input terminal *j* will turn on PNP transistor 136 and FETs 138 and 140 in the identical manner as hereinbefore described concerning terminal *i,* transistor 108 and FETs 124 and 132. Thus the waveform of FIG. 4J will result in terminal *n* being alternately grounded and not grounded and terminal *m* correspondingly, being alternately connected and not connected to the output impedance.

It is apparent that the demodulator can alternately route the A.C. amplified signals appearing at terminal *m* and *n* to ground or to terminal *w* by the application of a zero voltage or a positive voltage to timing input terminals *i* and *j*.

FIGS. 4K, 4L and 4M show the voltage waveforms applied to the load impedance 76, 78, 80 at terminal *w* of the balanced synchronous demodulator for the three sample and hold output voltage waveforms shown in phantom in FIGS. 4F, 4G and 4H, respectively. It will be understood, then, that the voltage waveforms shown in FIGS. 4K, 4L and 4M correspond to the balanced synchronous demodulator voltages for the presence of a ferrous object, a non-ferrous object and ferrous mineralized soil with no objects, respectively.

The D.C. voltage output of the balanced synchronous demodulator appearing at terminal *l* is produced by filtering the signals of FIGS. 4K, 4L and 4M through the low pass filter formed by load impedance 76, 78, 80. The corresponding demodulator output voltages are shown in phantom on FIGS. 4K, 4L and 4M.

The operation of the circuit of FIG. 2 will now be described with reference to the waveforms shown in FIG. 4. The circuit is first calibrated in the following manner: switch 82 is closed and variable resistor 90 adjusted so that meter 88 reads center scale. This calibrates the meter. Next, switch 82 is opened and offset circuit 46 is adjusted so that meter 88 again reads center scale. This compensates for any change in D.C. circuit bias voltages in the receive circuit. This is accomplished with no metallic objects or ferrous soil in proximity to the detector.

Then the metal detector is nulled by adjusting the null control 68 so that no residual voltage is induced in the receive coil. This is likewise accomplished with no metallic objects or ferrous soil present. After nulling, any material with a magnetic permeability greater than air, such as a ferrous metal object, which electromagnetically couples the two coils will cause a voltage pulse to be induced in receive coil 22 of a first polarity when a current pulse flows in transmit coil 20. Similarly any material of a less magnetic permeability than air, such as a non-ferrous metal object, will cause a voltage pulse of opposite polarity to be induced in receive coil 22.

The metal detector is then placed over the ground in a location where no objects are present and the potentiometer 60 is adjusted causing the sampling pulses produced by sample driver 62 and shown in FIG. 4D to be moved in time such that sample and hold circuit 64 samples the filtered receive voltage pulses of FIG. 4H induced in receive coil 22 and filtered by filter 28 at points on their waveforms of equal potential. The device has then "sampled out" the effects of the soil over which the metal detector is located regardless of whether the soil contains a ferrous mineralized background or not. However, as hereinbefore described, FIG. 4H shows a received signal produced by a ferrous mineralized soil background. By making this adjustment the operating point of the metal detector is set for the particular soil over which the detector is located. That is, after this adjustment has been made on potentiometer 60 thereby sampling out the effects of the soil, any ferrous or non-ferrous metallic objects subsequently electromagnetically coupling transmit coil 20 to receive coil 22 will cause the sample and hold circuit 64 to sample at points on the induced voltage pulses which are not of equal potential causing meter 88 to move off center in either direction.

The metal detector is then moved along the ground to search for metallic objects. The filtered receive voltage pulses induced in receive coil 22 when a ferrous object is present is shown in FIG. 4F. It will be noticed that the first receive voltage pulse P produced by a read transmit pulse after the polarizing transmit pulse O is larger in amplitude than the second receive voltage pulse Q. This voltage amplitude difference is due to the hysteresis loss in ferrous material caused by energy being utilized to shift the magnetic domains of the material. The amount of this "lost" energy is different for consecutive energy pulses due to the electromagnetic "memory" or hysteresis effect of ferromagnetic matter.

It will be seen in reference to FIG. 4F that the sample and hold voltage shown in phantom is a positive A.C. square wave caused by sampling the pair of receive voltage pulses at different voltage levels and times determined by the setting of the sampling pulses to eliminate the effect of the particular soil over which the device is located. In summary, the sample and hold circuit 64 generates a positive square wave for ferrous objects due to the fact that such ferrous objects are more ferrous than the ferrous mineralized background which has been "sampled out."

FIG. 4G shows the waveforms of the filtered receive voltage pulses induced in receive coil 22 when a non-ferrous object is present. It will be observed that the first receive pulse R received after polarizing transmit pulse O (FIG. 4E) is the same voltage amplitude as the second receive pulse S. This is due to the fact that non-ferrous objects exhibit no magnetic hysteresis effect. However, it is to be observed and understood that the sample and hold output signal shown in phantom in FIG. 4G is a negative A.C. square wave even though the receive voltage pulses are of equal amplitude. This is due to the fact that such receive pulses are sampled at different times, with the sampling times being determined by the setting of potentiometer 60 to "sample out" the effects of the mineralized soil background shown in FIG. 4H. It should be noted that for soil which is not mineralized or only lightly mineralized the two receive pulses are sampled at the same time, and for nonferrous objects the two sample voltage levels would be the same. In this case a conventional metal detector circuit can be used to detect both ferrous and non-ferrous objects.

It is to be understood that the waveforms shown in FIGS. 4F, 4G and 4H may vary in amplitude and shape somewhat due to the particular soil conditions and different object sizes, materials or configurations encountered in the field. In particular for clarity of explanation, the amplitudes of the voltage pulses in FIG. 4H due to the presence of ferrous soil are shown smaller than normally encountered in operating the device. Normally, these amplitudes would be large compared to those encountered in the presence of a metallic object. However, sometimes the receive signal for mineralized soil is smaller than that for metal objects and the waveforms will change.

It is to be further understood that the receive voltage waveforms produced by a ferrous object in a ferrous mineralized soil background would be the algebraic addition of FIGS. 4F and 4H, while the receive voltage waveforms produced by a non-ferrous object in a ferrous mineralized soil background would be the algebraic addition of waveforms 4G and 4H. Nevertheless, the principles of operation and the construction of the metal detector remain the same and the waveforms shown in FIGS. 4F, 4G and 4H are utilized for simplicity and clarity of explanation of the operation of the device.

The sample and hold output signal is A.C. coupled through coupling capacitor 73 to the input terminal k of the balanced synchronous demodulator 74 which demodulates such A.C. signal to a D.C. output voltage at the output l of such demodulator, as hereinbefore described regarding FIG. 3. The demodulator signals shown by solid lines in FIGS. 4K and 4L and by the phantom line in FIG. 4M are for the ferrous, non-ferrous and mineral soil receive signals in FIGS. 4F, 4G and 4H, respectively. These demodulator signals are filtered to produce the D.C. demodulator output signals shown in phantom in FIGS. 4K, 4L and 4M occurring at terminal l. The D.C. output signals are amplified in amplifier 84 and transmitted to the output display meter 88.

Figure 5:
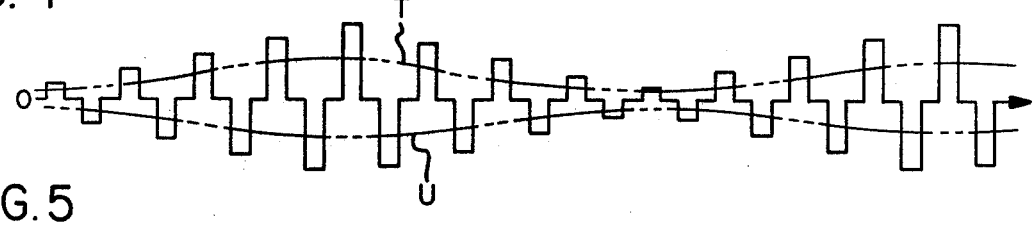
FIG. 5 shows the waveform at terminal w of the demodulator of FIG. 3.

The effects of relative motion between the metal detector and the ground are shown by solid lines in FIG. 4M and FIG. 5, which is on a less magnified time scale than FIG. 4M. Thus, the waveforms of FIG. 5 show the demodulator voltage at terminal w of the balanced synchronous demodulator 74 for the condition of a ferrous mineralized soil background present and relative motion between the metal detector and the soil. Each of the voltage pulses shown in FIG. 5 correspond to one of the voltage pulses shown in FIG. 4M when such relative motion is present.

It will be understood that the differences in amplitude between the successive positive voltage pulses and the successive negative voltage pulses in FIG. 5 are due to relative motion between the metal detector and the soil, causing different electromagnetic coupling between the transmit and receive coils. For illustration and description purposes, this has been shown as a sinusoidal motion in FIG. 5. However, it is to be understood that the motion may not be sinusoidal but of some other character without affecting the principle herein explained.

It will be observed upon close examination of FIG. 5 that the average D.C. level of the positive-going pulses, shown in phantom as line T, is approximately equal and opposite in polarity to the average D.C. level of the negative-going pulses, shown as phantom line U. These average D.C. levels, T and U, tend to cancel one another out when applied to filter capacitors 76 and 78 and filter resistor 80 shown in FIG. 2, thereby producing a D.C. demodulator output voltage of zero, nullifying the effects of relative motion between the metal detector and the soil. The same motion nulling effect occurs for the ferrous demodulator signal of FIG. 4K and the non-ferrous demodulator signal of FIG. 4L except the resultant D.C. demodulator output voltages are a positive D.C. voltage and a negative D.C. voltage, respectively.

The polarities shown in FIGS. 4F, 4G and 4H correspond to the transmit current pulses shown in FIG. 4E. If opposite polarity current pulses were utilized, the polarities of the waveforms of FIGS. 4F, 4G, 4H and 4K, 4L and 4M would be opposite to what is shown. This would not affect the operation of the device.

It will be obvious to those having ordinary skill in the art that many changes may be made in the preferred embodiment of the present invention without departing from the spirit of the invention. Therefore, the scope of the present invention should only be determined by the following claims.

I claim:

1. A metal detector for detecting and distinguishing between ferrous and non-ferrous metal objects in an area which may contain ferrous mineralized soil comprising:
   transmit coil means;
   receive coil means electromagnetically coupled to said transmit coil means by said area such that a current central flowing in said transmit coil means causes a corresponding voltage to be induced in said receive coil means;
   transmit pulse generator means electrically connected to said transmit coil means for generating transmit current pulses and applying said current pulses to said transmit coil means, said transmit pulses being provided as groups of pulses, each group including a pulse of a first polarity followed by at least two pulses of a second and opposite polarity;
   sampling means electrically connected to the output of said receive coil means, for sampling two receive voltage pulses corresponding to the voltage pulses induced in said receive coil means by the application of said two current pulses to said transmit coil means;
   control means electrically connected to said sampling means for adjusting the time of sampling of each of the two receive voltage pulses such that when no metal objects are present in said area, the two sampled voltage levels of said two voltage pulses are substantially equal; and
   output means electrically connected to the output of said sampling means for determining from the two sampled voltage levels of said two receive signals when a ferrous metal object is present in said area and indicating the presence of such ferrous metal object.

2. Apparatus in accordance with claim 1 in which the output means generates a first output if the first of said two sampled voltage levels is more positive than the second of said two voltage levels, generating a second and different output if the first of said two sampled voltage levels is more negative than the second of said two voltage levels, one of said first and second outputs corresponding to the presence of a ferrous metal object and the other corresponding to the presence of a non-ferrous metal object in said area, and generating a third and still different output if the said two sampled voltage levels are substantially equal, thereby indicating the absence of any metallic objects in said area.

3. Apparatus in accordance with claim 1 wherein said sampling means includes:
   sample and hold circuit means for sampling the receive voltage pulses and storing said two sampled voltage levels and providing a sample output signal corresponding to said two voltage levels.

4. Apparatus in accordance with claim 3 wherein the output means includes a demodulator means connected to the output of the sampling means, said demodulator converting the A.C. voltage output signal of the sample and hold means to a D.C. voltage demodulator output.

5. Apparatus in accordance with claim 4 which includes display means electrically connected to said demodulator means, such display means providing a display corresponding to said demodulator output.

6. Apparatus in accordance with claim 1 wherein said transmit pulse of a first polarity is of greater amplitude than each of said two transmit pulses of second and opposite polarity.

7. Apparatus in accordance with claim 1 wherein said metal detector has its transmit pulse generator and sampling means synchronized by a master clock oscillator.

8. Apparatus in accordance with claim 1 wherein each of said transmit current pulses within each of said groups are separated in time sufficiently to enable eddy currents induced in non-ferrous metal objects by one transmit pulse to terminate before the next transmit pulse is applied.

9. Apparatus in accordance with claim 1 wherein said transmit pulses are of substantially triangular waveforms so that said voltage pulses induced in said receive coil means are of substantially square waveforms.

10. Apparatus in accordance with claim 9 which includes low pass filter means connected between said receive coil means and said sampling means for filtering out high frequency components included in said voltage pulses induced in said receive oil means, and to provide filtered receive voltage pulses which are sampled by said sampling means.

11. Apparatus in accordance with claim 5 which includes filter means as the output load impedance of demodulator means, for producing a D.C. voltage demodulator output which is applied to said display means.

12. Apparatus in accordance with claim 4 wherein said demodulator means comprising inverter means for inverting said sample output signal and electronic switch means for generating a demodulator output voltage by alternately coupling said sample output signal and the inverted sample output signal to an output terminal of said demodulator means, thereby generating a first demodulator output voltage if the first of two sampled voltage levels is more positive than the second of said two voltage levels, generating a second and different demodulator output voltage if the first of said two sampled voltage levels is more negative than the second, and generating a third and still different demodulator output voltage if said two sampled voltage levels are equal.

13. Apparatus in accordance with claim 4 wherein said demodulator means comprises a balanced, synchronous demodulator.

14. Apparatus in accordance with claim 1 wherein said control means comprises:
   a ramp generator synchronized with said transmit pulse generator means;
   a voltage comparator having a first input connected to the output of said ramp generator;
   an adjustable reference voltage source connected to a second input of said comparator and providing a reference voltage including a square wave voltage added to a D.C. voltage and synchronized with said ramp generator such that the amplitude of said square wave voltage may be adjusted causing said comparator to generate successive comparator outputs adjustable in time relative to one another; and a sampling pulse generator having its input connected to the output of said comparator for generating sampling pulses at a time corresponding to said comparator output, said sampling generator having its output connected to said sampling means for causing said sampling means to sample said receive voltage pulses.

15. A metal detector for detecting and distinguishing between ferrous and non-ferrous metal objects in an area which may contain mineralized soil comprising:

transmit coil means;

receive coil means electromagnetically coupled to said transmit coil means by said area such that a current flowing in said transmit coil means causes a corresponding voltage to be induced in said receive coil means;

transmit pulse generator means electrically connected to said transmit coil means for generating transmit current pulses and applying said pulses to said transmit coil means, such transmit current pulses being provided as groups of pulses, each group including a polarizing pulse of a first polarity followed by at least two read pulses of a second and opposite polarity and of lesser amplitude than said pulse;

sample and hold circuit means for sampling two receive voltage pulses corresponding to the voltage pulses induced in said receive coil means by the application of said two read pulses to said transmit coil means, storing the two sampled voltage levels of said two receive pulses and providing a sample output signal corresponding to said two voltage levels;

a ramp generator synchronized with said transmit pulse generator means;

a voltage comparator having a first input connected to the output of said ramp generator;

an adjustable reference voltage source connected to a second input of said comparator and providing a reference voltage signal including a square wave voltage added to D.C. voltage and synchronized with said ramp generator, means for adjusting the amplitude of said square wave voltage to cause said comparator to generate successive comparator outputs adjustable in time relative to one another;

a sampling pulse generator having its input connected to the output of said comparator for generating sampling pulses corresponding in time to said comparator outputs, said sampling pulse generator having its output connected to said sample and hold circuit means for causing it to sample said receive voltage pulses; and balanced synchronous demodulator means connected to said sample and hold circuit for converting its A.C. sample voltage output to a D.C. voltage demodulator output and preventing changes in said demodulator output voltage due to motion of the transmit and receive coil relative to the ground.

* * * * *

UNITED STATES PATENT OFFICE
CERTIFICATE OF CORRECTION

Patent No. 4,110,679　　　　　　　　　　Dated August 29, 1978

Inventor(s) GEORGE C. PAYNE

It is certified that error appears in the above-identified patent and that said Letters Patent are hereby corrected as shown below:

Column 4, line 54, after "ground" insert --.--.

Column 11, claim 1, line 17, delete "central" after --current--.

Signed and Sealed this

Seventeenth Day of July 1979

[SEAL]

Attest:

Attesting Officer

LUTRELLE F. PARKER
*Acting Commissioner of Patents and Trademarks*